United States Patent [19]
Hansen

[11] 3,893,553
[45] July 8, 1975

[54] OVERLOAD RELEASE CLUTCH

[76] Inventor: Quinten A. Hansen, Highway 38, Franksville, Wis. 53126

[22] Filed: May 13, 1974

[21] Appl. No.: 469,308

[52] U.S. Cl............... 192/56 R; 64/29; 192/30 W; 192/150; 81/52.4
[51] Int. Cl............................................. F16d 7/02
[58] Field of Search.............. 192/56 R, 30 W, 150; 64/29, 30 R; 81/52.4

[56] References Cited
UNITED STATES PATENTS

| | | | |
|---|---|---|---|
| 2,889,022 | 6/1959 | Better et al. | 192/56 R |
| 2,978,082 | 4/1961 | Better | 192/56 R |
| 3,277,670 | 10/1966 | Bent | 192/56 R |
| 3,282,387 | 11/1966 | Becker et al. | 192/56 R |
| 3,675,749 | 7/1972 | Olson | 192/56 R |
| 3,754,412 | 8/1973 | Briggs | 192/56 R |
| 3,835,973 | 9/1974 | Braggins | 192/56 R |

Primary Examiner—Benjamin W. Wyche
Assistant Examiner—Randall Heald
Attorney, Agent, or Firm—James E. Nilles

[57] ABSTRACT

A uni-directional overload release clutch which when installed with one side thereof connected to a rotary power input element and with its other side connected to a rotary power output element provides a torque limited left hand drive and a solid right hand drive; and which upon installation in an end for end turned over position provides a torque limited right hand drive and a solid left hand drive.

In either case the clutch may be reengaged by forward rotation of the output element or by backward rotation of the input element through not more than a full turn.

9 Claims, 16 Drawing Figures

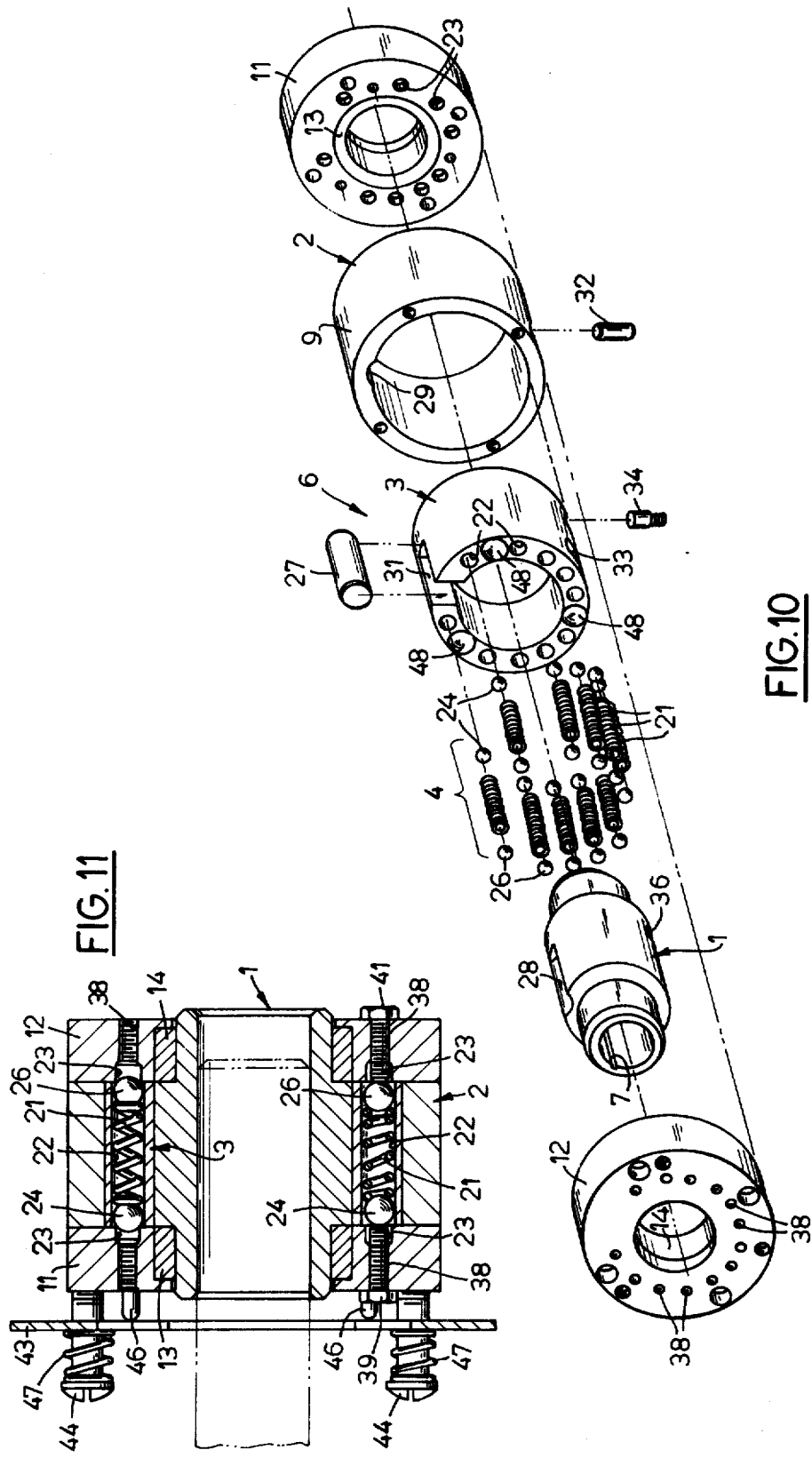

PATENTED JUL 8 1975 3,893,553

OVERLOAD RELEASE CLUTCH

BACKGROUND OF THE INVENTION

The invention relates to releasable torque transmitting couplings and it is concerned more particularly with a self-releasing clutch which will transmit only a limited amount of torque from one rotary element to another.

While the principal purpose of torque limiting clutches is to protect various types of power driven equipment against overload, such clutches have heretofore also been perfected to take care of several specific requirements. For instance, in many installations it is desirable that once the clutch has become disengaged due to an overload it should stay disengaged as long as the overload condition persists, and that the clutch can be reengaged by torque reversal at will when the overload condition has abated to the point where operation of the driven equipment can be resumed. When the clutch idles, that is, while its driving member continues to rotate and its driven member is at a standstill, friction losses between the driving and driven members and wear of the relatively engageable and disengageable clutch elements should be at a minimum. Further, the torque load at which the clutch becomes disengaged should be precisely fixed, that is, disengagement should take place at the exact moment when the torque reaches a given limit. In its engaged driving condition the clutch should provide a positive driving connection between the driving and driven shafts, that is, there should be no gradual yielding between the driving and driven clutch parts. The driving connection should be disrupted instantaneously when the given torque limit has been reached. In some installations it is also desirable that the driving and driven clutch parts can be reengaged in only one rotatively adjusted position relative to each other. This requirement usually has the purpose of maintaining a time relationship between several operating units that are driven from a single power source. Provisions should also be made to vary the torque limit at which the clutch will automatically disengage under an overload, and such variation to increase or decrease the torque limit should be possible conveniently without dismantling the clutch. Another provision which is frequently desired is that the clutch should be unidirectional, that is, it should provide torque control in one direction and solid drive in the opposite direction.

SUMMARY OF THE INVENTION

The present invention provides an improved overload release clutch which will take care of the hereinabove mentioned specific requirements in a practical and fully satisfactory manner.

More specifically, the invention provides a unidirectional overload release clutch which when installed with one side thereof connected to a rotary power input element and with its other side connected to a rotary power output element provides a torque limited left hand drive and a solid right hand drive; and which upon installation in an end for end turned over position provides a torque limited right hand drive and a solid left hand drive.

In either case the clutch may be reengaged by forward rotation of the output element or by backward rotation of the input element through not more than a full turn.

The invention further provides a unidirectional overload release clutch of the above mentioned character in which radially inner and outer clutch members are rotatable, respectively, within and around an annular rotor; spring loaded, torque limiting detent balls are positioned in the rotor and cooperate with ball pockets in the outer clutch member; and a shuttle key on the rotor is movable back and forth between a radially inward and a radially outward adjusted position. Normal loads are transmitted from the outer clutch member to the rotor, or vice versa, by the seated detent balls, and from the rotor to the inner clutch member, or vice versa, by the inwardly adjusted shuttle key. When the detent balls are unseated under an overload, relative rotation of the outer clutch member and rotor moves the shuttle key to its outwardly adjusted position in which it releases the rotor from the inner clutch member and couples the rotor to the outer clutch member.

The invention further provides an overload release clutch of the above outlined character wherein the torque limit may readily be varied by plugging or unplugging one or more of the ball pockets of the outer clutch member.

The invention further provides an overload release clutch of the above outlined character whose disengaged condition may readily be signaled to an indicating device such as a visual or audible alarm, or to a power shut-off device.

DRAWINGS

The foregoing and other features and advantages of the invention will become more fully apparent as this disclosure proceeds with reference to the accompanying drawings wherein:

FIG. 10 is an exploded view of the end for end turned over clutch shown in FIG. 2, parts shown at the outside of the clutch in FIG. 2 being omitted in FIG. 10;

FIG. 11 is a view similar to FIG. 3 but showing the clutch adjusted for release at a smaller torque load than in FIG. 3;

Figure 2:
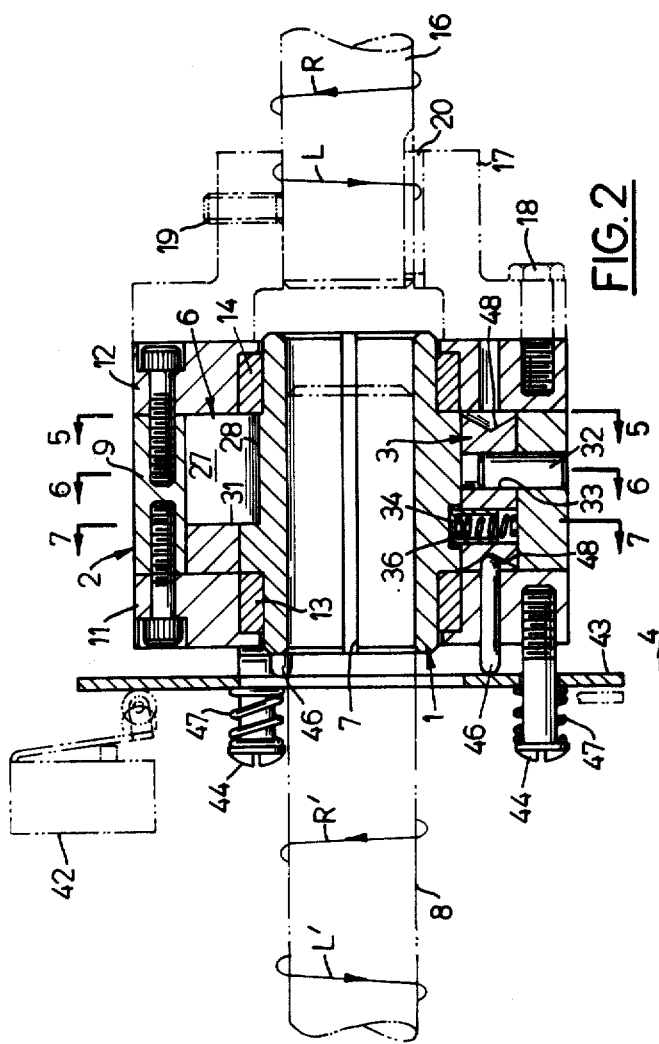
FIG. 2 is a section on line 2—2 of FIG. 1, parts not shown in FIG. 1 being shown in broken lines in FIG. 2.
Figure 12:
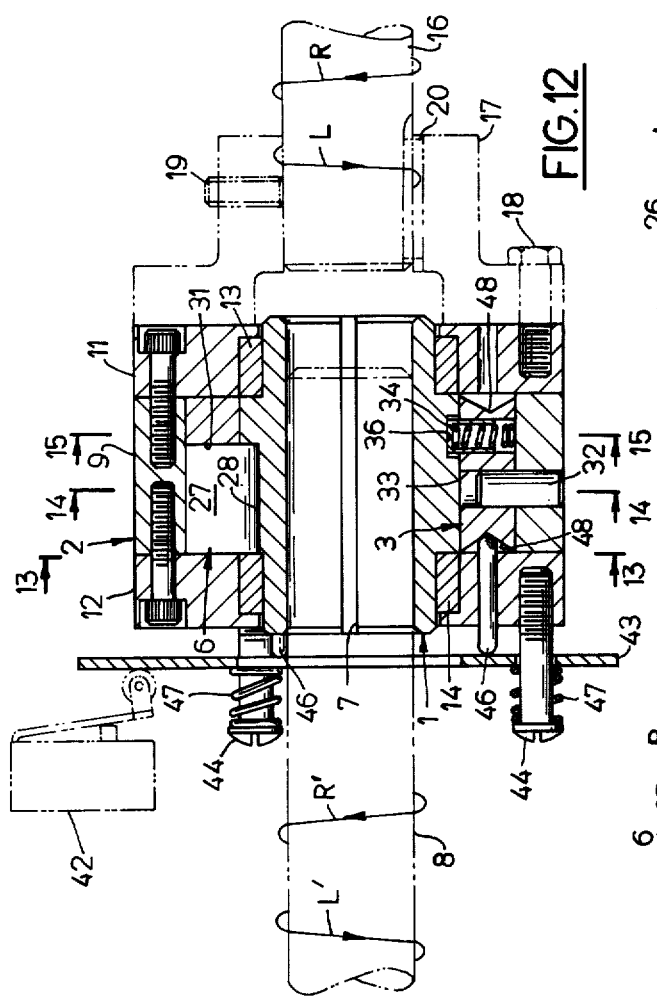
Figure 16:
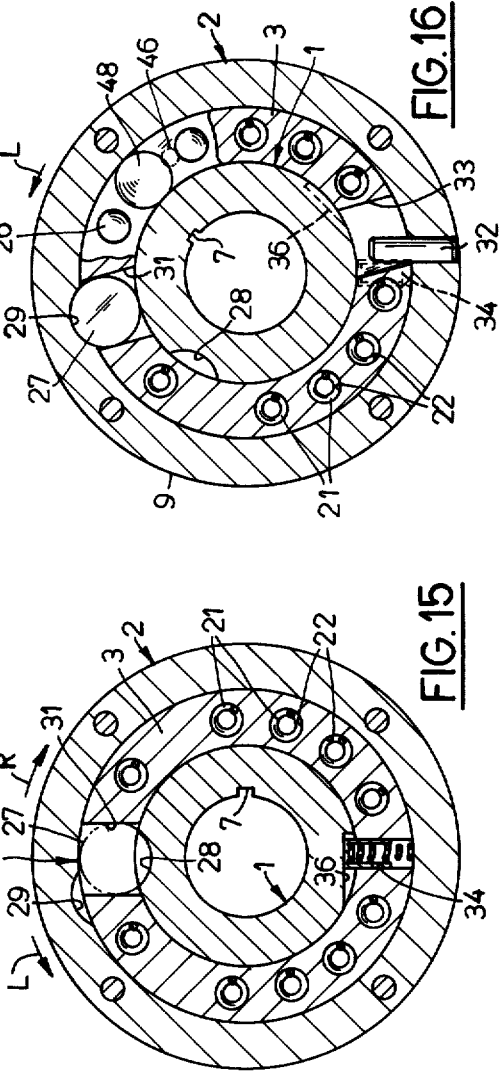
Figure 15:
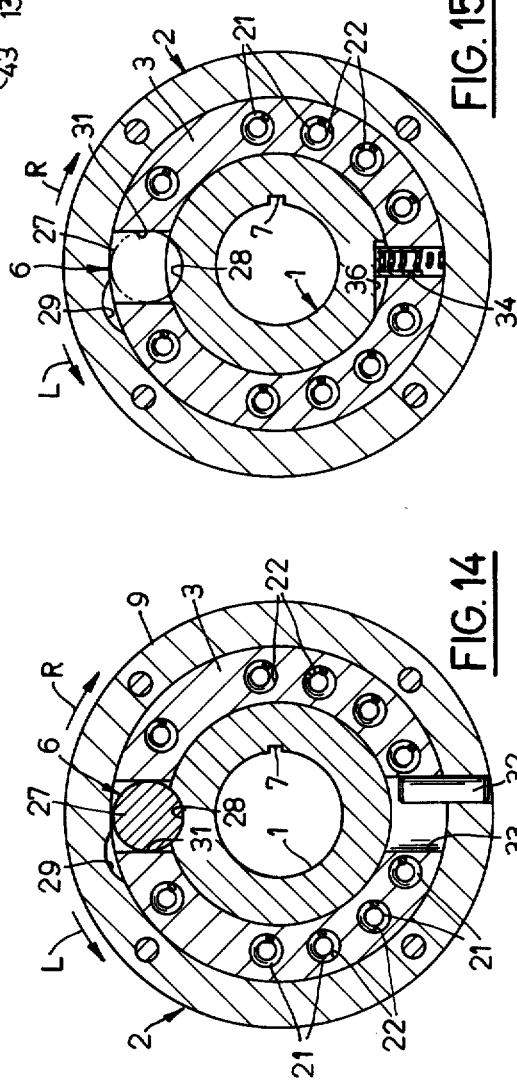
Figure 13:
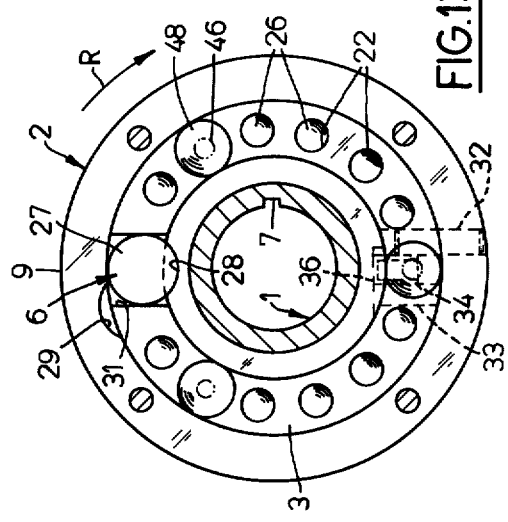
Figure 14:
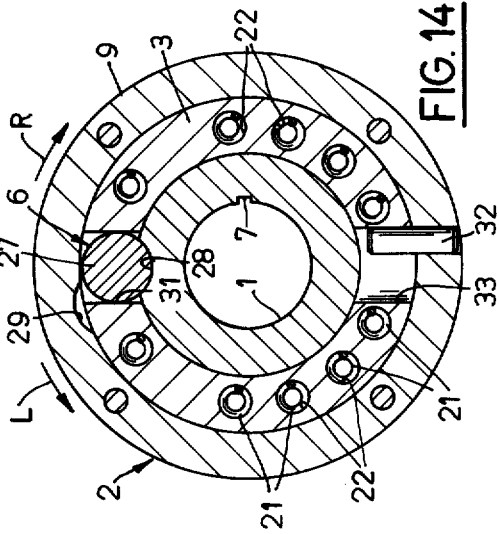

FIG. 12 is a sectional view similar to FIG. 2 but showing the clutch installed in an end for end reversed position between the same power input and output shafts as in FIG. 2; and FIGS. 13 through 15 are sectional views on line 13—13, line 14—14, line 15—15, respectively, of FIG. 12, and FIG. 16 is a view similar to FIG. 14 but showing the clutch in a different condition of adjustment.

DESCRIPTION OF THE INVENTION

The principal components of the clutch shown in the drawings are a radially inner clutch member 1 and radially outer clutch member 2 defining an annular space therebetween; a rotor 3 within said space; ball detent means generally designated by the reference numeral 4 (FIG. 10) operatively interposed between the rotor 3 and the outer clutch member 2, and double throw lock-up means, generally designated by the reference numeral 6, (FIG. 10), which are operatively associated with the inner and outer clutch members 1 and 2 and with the rotor 3 and by means of which the rotor may be coupled selectively with either the inner clutch member 1 or with the outer clutch member 2.

The inner clutch member 1 has the shape of a tubular sleeve with an internal key way 7 accommodating a driving key, not shown, on a rotary shaft 8 (FIG. 2). The outer clutch member 2 comprises a cylindrical drum 9 and opposite end walls 11 and 12 secured to the drum 9 and straddling the rotor 3. Sleeve bearings 13 and 14 rotatably support the outer clutch member 2 on opposite end portions of the inner clutch member 1. The end wall 12 of the outer clutch member is connected to a rotary companion shaft 16 (FIG. 2) by means of a hub 17 which is secured to the end wall 12 by cap screws 18 and to the shaft 16 by a set screw 19 and a key 20. Instead of connecting the outer clutch member to a coaxial shaft as shown in FIG. 2, a sprocket, pulley, gear or other torque transmitting element, not shown, may be secured directly to the end wall 11 or 12 of the outer clutch member for side driving to an adjacent parallel shaft.

The rotor 3 has the shape of a cylindrical drum which has a running fit at its inner periphery on the outer cylindrical surface of the inner clutch member 1, and at its outer periphery the rotor 3 has a running fit on the inner periphery of drum 9 of the outer clutch member.

Figure 3:
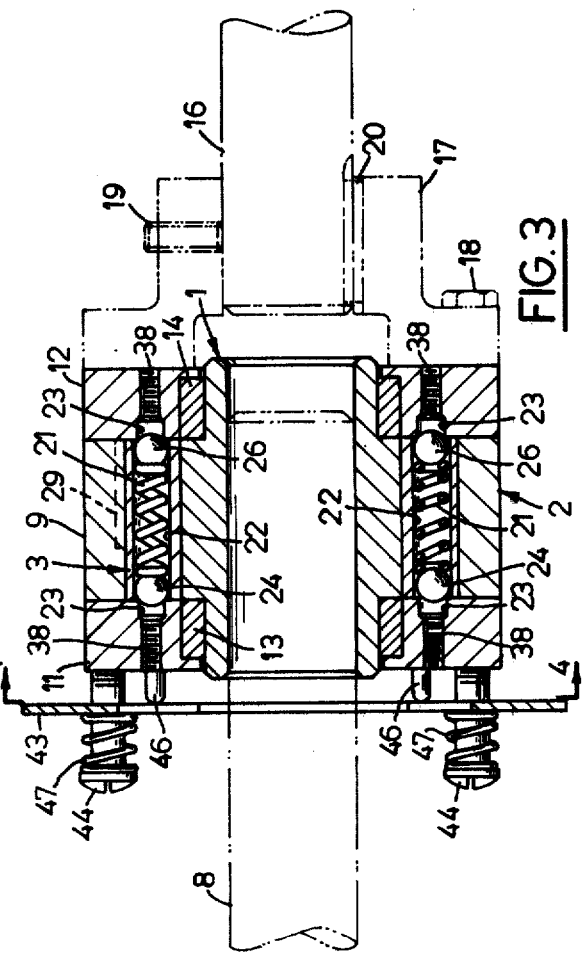
FIG. 3 is a section on line 3—3 of FIG. 1.
Figure 1:
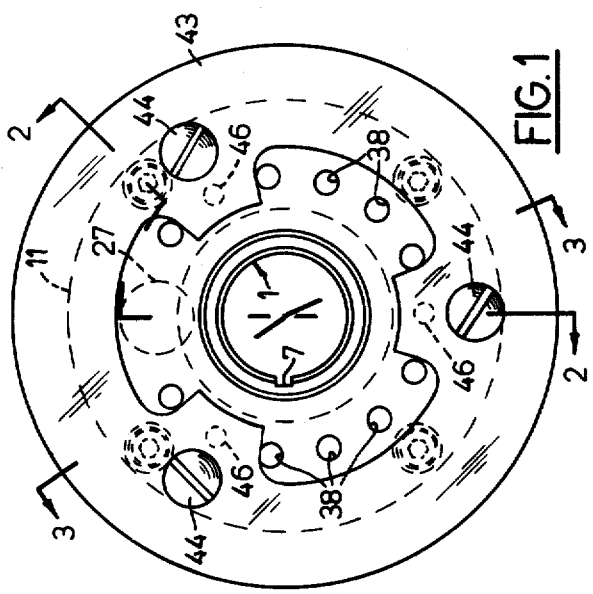
FIG. 1 is an end view of an overload release clutch embodying the invention.
Figure 4:
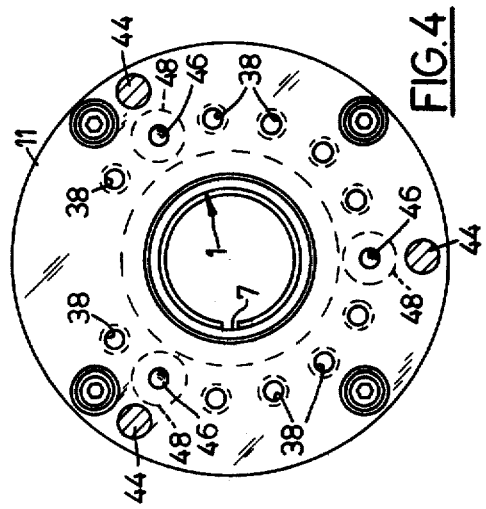
FIG. 4 is an end view on line 4—4 of FIG. 3.

The ball detent means 4 comprise a number of coil springs 21 which are enclosed, respectively, in a circular series of axial through bores 22 of the rotor 3. Each of the end walls 11 and 12 of the outer clutch member 1 has a circular series of ball pockets 23 which have the same circumferential spacings from each other as the through bores 22 of the rotor 3. A circumferential series of detent balls 24 is positioned in the ends of through bores 22 adjacent to the end wall 11, and another circumferential series of detent balls 26 is positioned in the ends of the through bores 22 adjacent to the end wall 12. The balls 24 and 26 at the opposite ends of each through bore 22 are urged apart by the coil springs 21 (FIG. 3), and the balls are partially received by the ball pockets 23 when the outer clutch member 2 and the rotor 3 are in a rotatively adjusted position relative to each other in which the through bores 22 register with the ball pockets 23.

The double throw lock-up means 6 between the rotor 3 and the inner and outer clutch members 1 and 2 comprise a radially reciprocable shuttle key 27 in the rotor 3, an arcuate seating recess 28 for the key at the outer periphery of the inner clutch member 1, and an arcuate seating recess 29 for the key 27 at the inner periphery of the outer clutch member 2. The rotor 3 has an axial cutout 31 (FIG. 10) which closely straddles the key 27 so that it will rotate in unison with the rotor about the axis of the latter but will be free to move back and forth sidewise into the seating recesses 28 and 29.

Torque transmitting lost motion connecting means between the rotor 3 and the outer clutch member 2 comprise a pin 32 (FIG. 6) which is secured to the drum 9 of the outer clutch member and projects inwardly therefrom into a circumferential gap 33 of the rotor 3.

Figure 7:
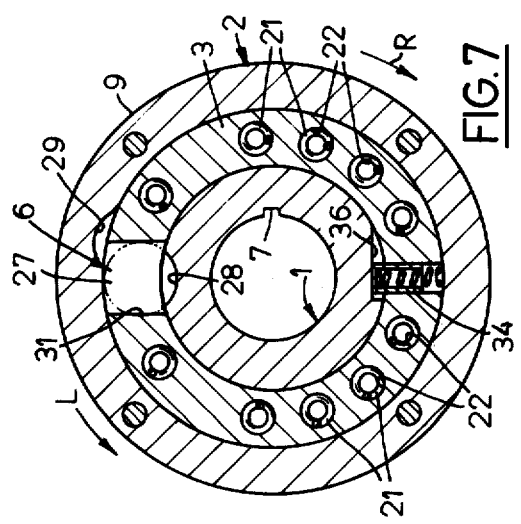
FIG. 7 is a section on line 7—7 of FIG. 2.

Operatively interposed between the rotor 3 and the inner clutch member 1 are one-way torque transmitting means (FIG. 7) comprising a spring loaded plunger 34 which is reciprocable in a radial bore of the rotor 3, and a tangential pocket 36 at the outer periphery of the inner clutch member 1, the plunger 34 being operable to enter into and recede from the pocket 36 when the rotor 3 rotates relative to inner clutch member 1 in the direction of the arrow L in FIG. 7. Rotation of the inner clutch member 1 in the direction of arrow L is transmitted to the rotor 3 by engagement of the peripheral end wall of the pocket 36 with the projected plunger 34.

As already mentioned, the herein disclosed overload release clutch may be used optionally without structural alteration for either a right hand drive or for a left hand drive. In this connection, the following should be noted.

Considering the shaft 16 in FIG. 2 as the power input shaft and the shaft 8 as the power output shaft, a torque limited left hand drive and a solid right hand drive will be transmitted from the shaft 16 to the shaft 8 if the clutch is installed between the shafts as shown in FIG. 2. On the other hand, if the clutch is installed between the power input and power output shafts 16 and 8 in an end for end turned over position (FIG. 12), it will transmit a torque limited right hand drive and a solid left hand drive from the shaft 16 to the shaft 8.

Torque Limited Left Hand Drive

Figure 5:
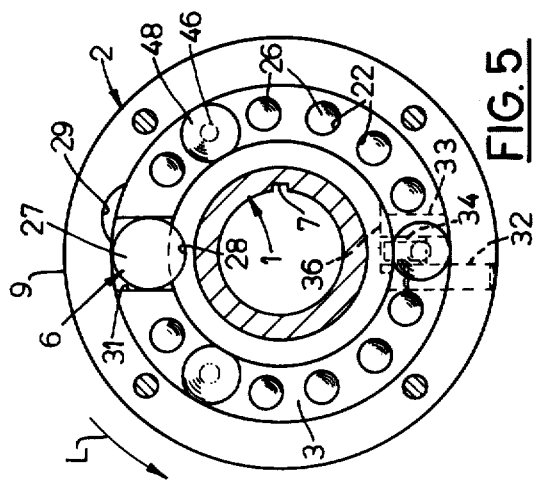
FIG. 5 is a section on line 5—5 of FIG. 2.

For left hand drive, that is, for rotation of the shaft 8 (FIG. 2) in the direction of arrow L', left hand rotation of the outer clutch member 2 as indicated by the arrow L in FIG. 2 is transmitted to the rotor 3 by operation of the ball detent means 4, and the resulting left hand rotation of the rotor is transmitted to the inner clutch member 1 by operation of the shuttle key 27 (FIG. 5).

Figure 9:
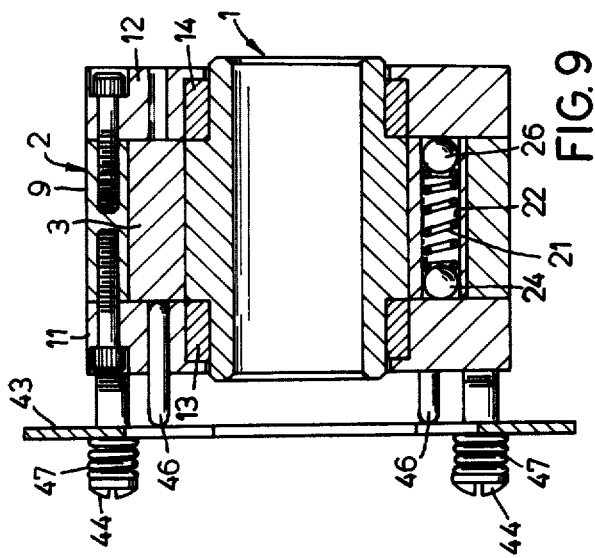
FIG. 9 is a section on line 9—9 of FIG. 8.

When the left hand driving torque reaches the given limit the outer clutch member becomes uncoupled from the rotor 3 by release of the balls 24, 26 from the pockets 23, as illustrated in FIG. 9. Continued rotation of the outer clutch member in the direction of arrow L in FIGS. 5–7 brings the seating recess 29 into radial alignment with the shuttle key 27. The shuttle key 27 thereby becomes free to roll out of the recess 28 and into the recess 29.

Figure 8:
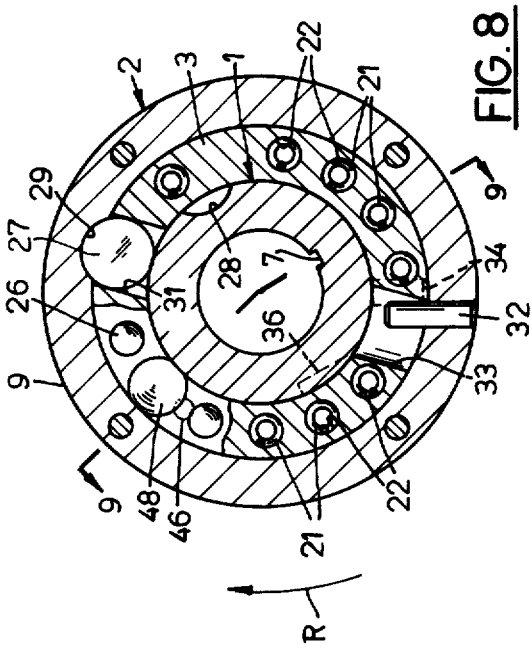
FIG. 8 is a view similar to FIG. 6 but showing the clutch in a different condition of adjustment.
Figure 6:
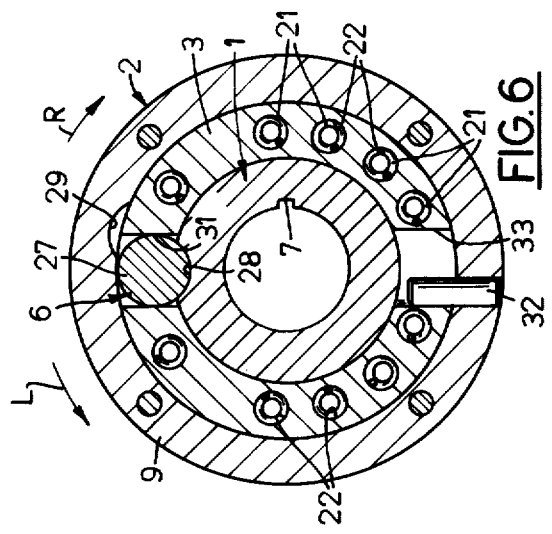
FIG. 6 is a section on line 6—6 of FIG. 2.

The range of rotational displacement of the outer clutch member 2 and rotor 3 relative to each other is limited by the lost motion torque transmitting connection afforded by the pin 32 (FIG. 6) and gap 33 in the rotor 3. As shown in FIG. 6, engagement of the clutch places the pin 32 at one end of the gap 32. Upon release of the balls 24, 26 from the pockets 23 and subsequent continued rotation of the outer clutch member in the direction of arrow L the pin 32 will engage the other end of the gap 33 as shown in FIG. 8 and the key 27 will be rolled out of the recess 28 and into the recess 29 by the torque of the rotor 3. In this position the balls 24, 26 will be completely out of detent holes 23 and will be bearing against the end walls 11 and 12. Thereafter, the outer clutch member 2 and the rotor 3 will rotate in unison in the direction of arrow L under the left hand driving torque of shaft 16. At the same time the key 27 will move with the outer clutch member and rotor around the inner clutch member 1. During such rotation, when the key passes the recess 28 it will skip it since the rotor slot 31 and recess 29 remain aligned with no relative angular force acting to impart relative rotation between the rotor and the outer clutch member. Accordingly, no significant driving torque will be transmitted to the inner clutch member and the clutch may idle indefinitely without any appreciable friction losses and consequent wear.

After the left hand drive from the input shaft 16 to the output shaft 8 has been interrupted due to an overload it may be reestablished either by turning the output shaft 8 forward, that is, in the direction of arrow L' in FIG. 2 while the input shaft 16 is kept at standstill, or by turning the input shaft 16 backward, that is, in the direction of arrow R in FIG. 2 while the output shaft 8 is kept at standstill. In either case reestablishment of the left hand drive is controlled by the spring pressed plunger 34. Forward rotation of output shaft 8 in the direction of arrow L' in FIG. 2 brings the closed end of the pocket 36 (FIG. 7) into engagement with the plunger 34, and as the forward rotation of shaft 8 is continued the inner clutch member 1 and the rotor 3 rotate in unison until the detent balls 24, 26 become seated in the ball pockets 23 and the shuttle key 27 becomes trapped in the recess 28 of the inner clutch member 1.

On the other hand, if the input shaft 16 is rotated backward, that is, in the direction of arrow R in FIG. 2 while the output shaft 8 is kept at standstill, the rotor 3 also moves in that direction due to the fact that the shuttle key 27 is trapped in recess 29, locking rotor 3 to outer drum 9 as shown in FIG. 8. As the unitary rotation of the outer clutch member and rotor 2 in the direction of arrow R is continued the spring-loaded plunger 34 strikes the shoulder of recess 36 in the inner member 1. At this position, recess 28 in inner member 1 is in position to receive shuttle key 27; and rotor 3 and inner member 1 begin to rotate in unison and cause relative rotation between rotor 3 and drum 9 until the detent balls 24, 26 become seated in the ball pockets 23 and the shuttle key 27 again becomes trapped in the recess 28 of the inner clutch member 1.

SOLID RIGHT HAND DRIVE

When the clutch is engaged and right hand driving torque is transmitted to the outer clutch member by the input shaft 16, such torque is solidiy transmitted to the output shaft 8 because release of the ball detent means 4 is prevented by the pin 32 which bears clockwise upon the rotor 3 within the gap 33.

Torque-Limited Right Hand Drive

For torque-limited right hand drive with the input shaft 16 and output shaft 8 as shown in FIG. 2 and with drive directions also as shown in FIG. 2, simply install the clutch in an end for end reversed position, as shown in FIG. 12. Since the clutch end plates 11 and 12 are identical, the reversal permits mounting the input hub 17 and switchplate 43 on opposite clutch ends just as in FIG. 2.

Upon reversing the clutch (turning end for end), the internal mechanism reverses also as shown by FIGS. 13 through 16.

When the clutch is installed in the end for end reversed position as shown in FIG. 12, right-hand rotation of input shaft 16 and outer drive member transmits torque to rotor 3 by the ball-detent means and from rotor 3 to inner member 1 by means of shuttle-key 27 in the manner which has been described with reference to FIG. 2 under torque-limited left hand drive. Likewise, the sequence of events causing overload disengagement and re-engagement is exactly the same as described with reference to FIG. 2 for torque-limited left hand drive. To re-engage simply turn the output shaft 8 forward or the input shaft 16 backward one turn or less.

Solid Left-Hand Drive

With the clutch turned end for end as shown in FIGS. 12–16, rotation of the input shaft 16 in the left hand direction, as indicated by the arrow L in FIG. 12, transmits torque from outer drive member to the rotor as in FIG. 2, except that the ball-detent means cannot disengage because drive pin 32 is bearing solidly on rotor slot 33 so disengagement cannot occur.

FIG. 11 illustrates removable filler means for a pair of axially opposite ball pockets 23 in the end walls 11 and 12, respectively, of the outer clutch member 2. A threaded bore 38 is axially aligned with the ball pocket 23 in the end wall 11, and another threaded bore 38 is axially aligned with the ball pocket 23 in the end wall 12. Cap screws 39 and 41 are drawn up solidly in the threaded bores 38 of the endwalls 11 and 12, and in that condition the inner ends of the cap screws are flush with the inner radial faces of the end walls 11 and 12, respectively. Installation of the cap screws 39 and 41 disables one pair of detent balls 24, 26 and accordingly diminishes the torque load at which the clutch will automatically disengage itself under an overload. Additional pairs of detent balls may be similarly disabled by the installation of additional cap screws in order to further reduce the torque limit of the clutch. The threaded bores 38 at the active pair of detent balls may be sealed by cap screws shorter than the cap screws 29 and 41.

In order to signal disengagement of the clutch to a visual or audible alarm or to a shut off device (not shown), the clutch may be provided with an actuating mechanism for a stationary micro switch 42 which responds to the rotor displacement of the clutch. As shown in FIG. 2, the actuating mechanism for the micro switch 42 comprises an annular thrust plate 43 which is supported for axial back and forth movement on three studs 44 which are threaded into the end wall 11 of the outer clutch member at 120° circumferential spacings from each other. The side of the thrust plate 43 facing the endwall 11 of the outer clutch member radially overlaps three drift pins 46 which are mounted at 120° angular spacings from each other in the end wall 11 for axial inward and outward movement. Coil springs 47 around the studs 44 urge the thrust plate 43 toward the end wall 11 of the outer clutch member and the thrust plate in turn urges the drift pins 46 axially against the adjacent end face of the rotor 3. Three conical recesses 48 in this end face of the rotor are aligned, respectively, with the drift pins 46 when the clutch is engaged, and the pressure of the springs 47 locates the thrust plate 43 in an axially inward adjusted position which leaves the micro switch 42 open. When an overload causes disengagement of the clutch, the resulting rotary displacement of the rotor 3 relative to the outer clutch member cams the drift pins 46 outward, and the resulting axial displacement of the thrust plate 43 closes the micro switch 42. When the clutch is reengaged by torque reversal as explained hereinbefore, the drift pins 46 slide back into the outer clutch member and the micro switch opens.

In FIG. 12, which shows the clutch installed in an end for end reversed position between the driving shaft 16 and the driven shaft 8, the switch plate 43 is mounted on the end wall 12 and the drift pins 46 for actuating the switch plate 43 are reciprocable in axial holes of the end plate 12 corresponding to the axial drift pin mounting holes of the end wall 11. With the switch plate 43 installed as shown in FIG. 12, the switch 42 is actuated in the same manner as has been explained with reference to FIG. 2.

I claim:

1. An overload release clutch comprising radially inner and outer clutch members defining an annular space therebetween, a rotor within said space; detent means operatively interposed between said rotor and one of said clutch members; and double throw lock-up means operatively associated with said inner and outer clutch members and with said rotor whereby said rotor may be coupled selectively with either said inner or with said outer clutch member.

2. An overload release clutch as set forth in claim 1 and further comprising torque transmitting lost motion connecting means between said rotor and said outer clutch member.

3. An overload release clutch as set forth in claim 1 and further comprising one-way drive transmitting means operatively interposed between said rotor and inner clutch member.

4. An overload release clutch as set forth in claim 1 and further comprising torque transmitting lost motion connecting means between said rotor and said outer clutch member, and one-way drive transmitting means between said rotor and said inner clutch member.

5. An overload release clutch as set forth in claim 1, wherein said double throw lock-up means comprise a radially reciprocable shuttle key on said rotor and seating recesses for said shuttle key in the outer periphery of said inner clutch member and in the inner periphery of said outer clutch member, respectively.

6. An overload release clutch as set forth in claim 1, wherein said outer clutch member comprises a peripheral wall and opposite end walls straddling said rotor, and wherein said ball detent means are operatively interposed between said rotor and at least one of said end walls.

7. An overload release clutch as set forth in claim 6, wherein said rotor has a circumferential series of axial bores, wherein each of said end walls has a circumferential series of ball pockets adapted to register, respectively with said axial rotor bores, and wherein said detent means comprise a series of coil springs housed, respectively, in said rotor bores, and a pair of balls at the axially opposite ends of each of said coil springs, said balls being urged, respectively, in axially opposite directions against said end plates and cooperable with said ball pockets to thereby establish a releasable torque transmitting connection between said rotor and said outer clutch member.

8. An overload release clutch as set forth in claim 7 and further comprising removable filler means for said ball pockets.

9. An overload release clutch as set forth in claim 6 and further comprising a circumferential series of drift pins reciprocably seated in one of said end walls, and means operatively associated with said outer clutch member and rotor for reciprocating said studs in response to rotary displacement of said outer clutch member relative to said rotor in opposite directions.

* * * * *